United States Patent
Hasslen et al.

(10) Patent No.: US 8,694,955 B2
(45) Date of Patent: Apr. 8, 2014

(54) FLOW AND METHODOLOGY TO FIND TDP POWER EFFICIENCY

(75) Inventors: Robert J. Hasslen, Menlo Park, CA (US); Miodrag Vujkovic, Mountain View, CA (US); Anish Muttreja, San Jose, CA (US); Kaushal Rajendra Gandhi, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 398 days.

(21) Appl. No.: 12/885,381

(22) Filed: Sep. 17, 2010

(65) Prior Publication Data

US 2011/0072412 A1   Mar. 24, 2011

Related U.S. Application Data

(60) Provisional application No. 61/245,597, filed on Sep. 24, 2009.

(51) Int. Cl.
*G06F 9/44*   (2006.01)

(52) U.S. Cl.
USPC .............................. 717/106; 717/104

(58) Field of Classification Search
USPC .................... 717/106, 104; 703/13, 14, 6
See application file for complete search history.

(56) References Cited

U.S. PATENT DOCUMENTS 8,019,580 B1 *   9/2011   Chandra et al. .................. 703/6

* cited by examiner

*Primary Examiner* — Qamrun Nahar
(74) *Attorney, Agent, or Firm* — Patterson + Sheridan, L.L.P.

(57) ABSTRACT

A technique for determining thermal design point (TDP) power efficiency for an integrated circuit is disclosed. A simulation executes a set of input vectors on a model of an integrated circuit to generate a first estimated power consumption data during a first number of clock cycles. A simulation executes the set of input vectors on a model of an integrated circuit to generate a second estimated power consumption data during a second number of clock cycles. TDP power efficiency for the integrated circuit is calculated based on the first estimated power consumption data and the second estimated power consumption data.

20 Claims, 9 Drawing Sheets

FLOW AND METHODOLOGY TO FIND TDP POWER EFFICIENCY

CROSS REFERENCE TO RELATED APPLICATIONS

This application claims priority benefit to U.S. provisional patent application titled, "FLOW AND METHODOLOGY TO FIND TDP POWER EFFICIENCY" filed on Sep. 24, 2009 and having Ser. No. 61/245,597.

BACKGROUND OF THE INVENTION

1. Field of the Invention

The invention relates generally to design of integrated circuits and, more specifically, to a flow and methodology to find thermal design point power efficiency.

2. Description of the Related Art

Clock gating is one technique used to reduce an integrated circuit's power consumption requirements. The clock gating percentage is a metric commonly used to evaluate the relative thermal design point (TDP) power efficiencies for integrated circuit designs. One approach for calculating clock gating percentage is to count the number of clock gated flip-flops and compare it to the total number of flip-flops. Another approach for calculating clock gating percentage is to evaluate register transfer level (RTL) code to identify the usage of enable signals.

One drawback to measuring TDP power efficiency using clock gating percentage is that this value does not distinguish between efficient and inefficient clock gating designs. For example, a pipelined processor that has separate clock enable signals for each individual stage of the execution pipeline may be more efficient than a pipelined processor where a single clock enable signal is shared among all stages of the execution pipeline, even though the clock gating percentages for both execution pipelines are one hundred percent.

As the foregoing illustrates, what is needed in the art is an improved method for measuring the thermal design point power efficiency of integrated circuit designs.

SUMMARY OF THE INVENTION

One embodiment of the present invention sets forth a method for determining thermal design point (TDP) power efficiency for an integrated circuit. The method includes the steps of simulating the execution of a set of input vectors on a model of the integrated circuit to generate a first estimated power consumption data for the integrated circuit during a first number of clock cycles, where the set of input vectors represent a high-activity workload for the integrated circuit, and simulating the execution of the set of input vectors on the model of the integrated circuit to generate a second estimated power consumption data for the integrated circuit during a second number of clock cycles, where the second number of clock cycles is larger than the first number of clock cycles. The method also includes the step of calculating TDP power efficiency for the integrated circuit based on the first estimated power consumption data and the second estimated power consumption data.

One advantage of the disclosed method is that the actual efficiency of an integrated circuit device when entering low power states during periods of inactivity is examined. By contrast, conventional approaches for determining TDP power efficiency merely look at whether clock-gating logic exists, but fail to examine the actual functionality of the clock-gating logic to determine activity during periods of inactivity. The disclosed metric provides integrated circuit designers with more precise information that accurately reflects the efficiency of power saving techniques implemented in integrated circuit devices.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
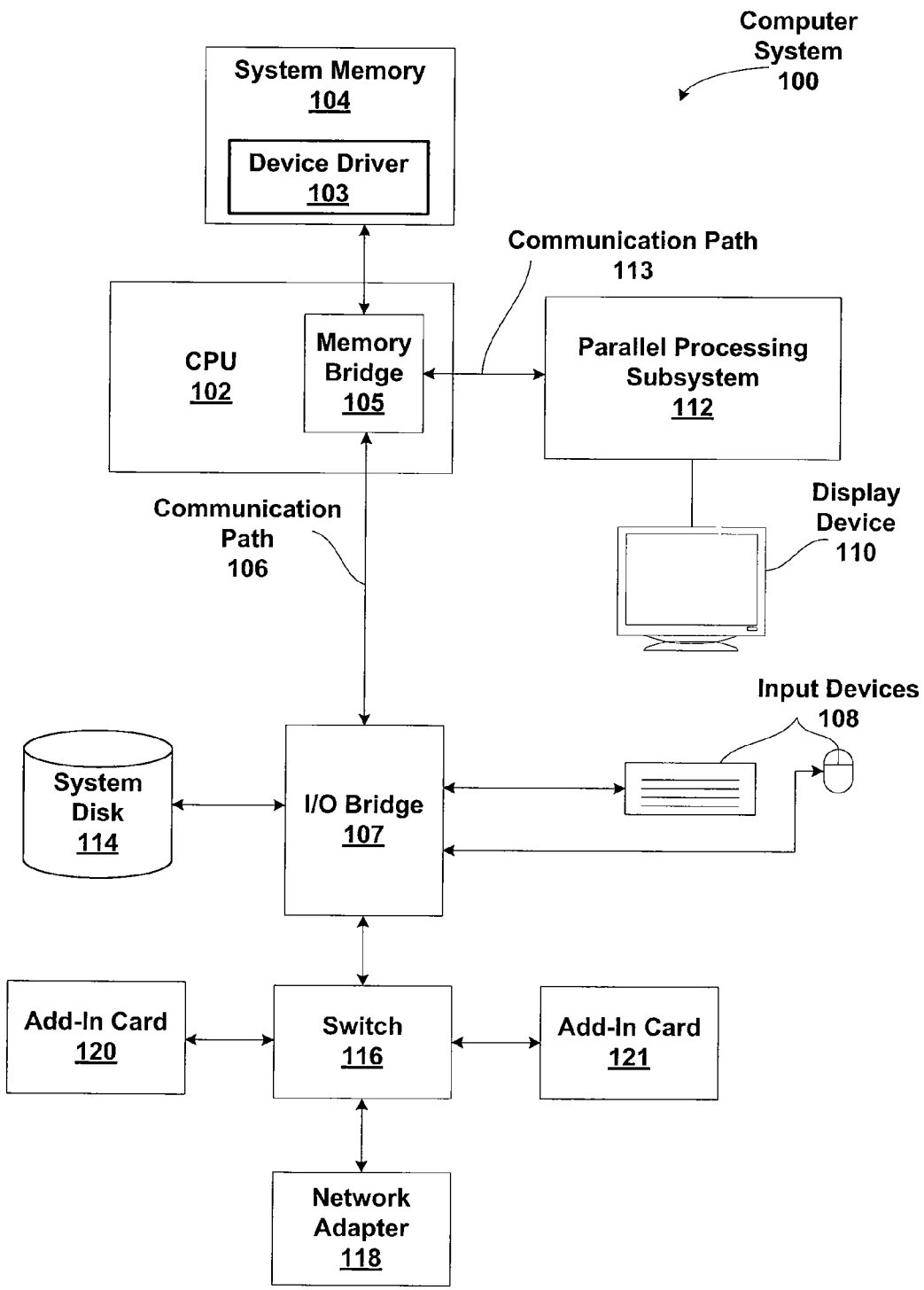
FIG. 1 is a block diagram illustrating a computer system within which one or more aspects of the invention may be implemented.

FIG. 1 is a block diagram illustrating a computer system 100 configured to implement one or more aspects of the invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/ output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
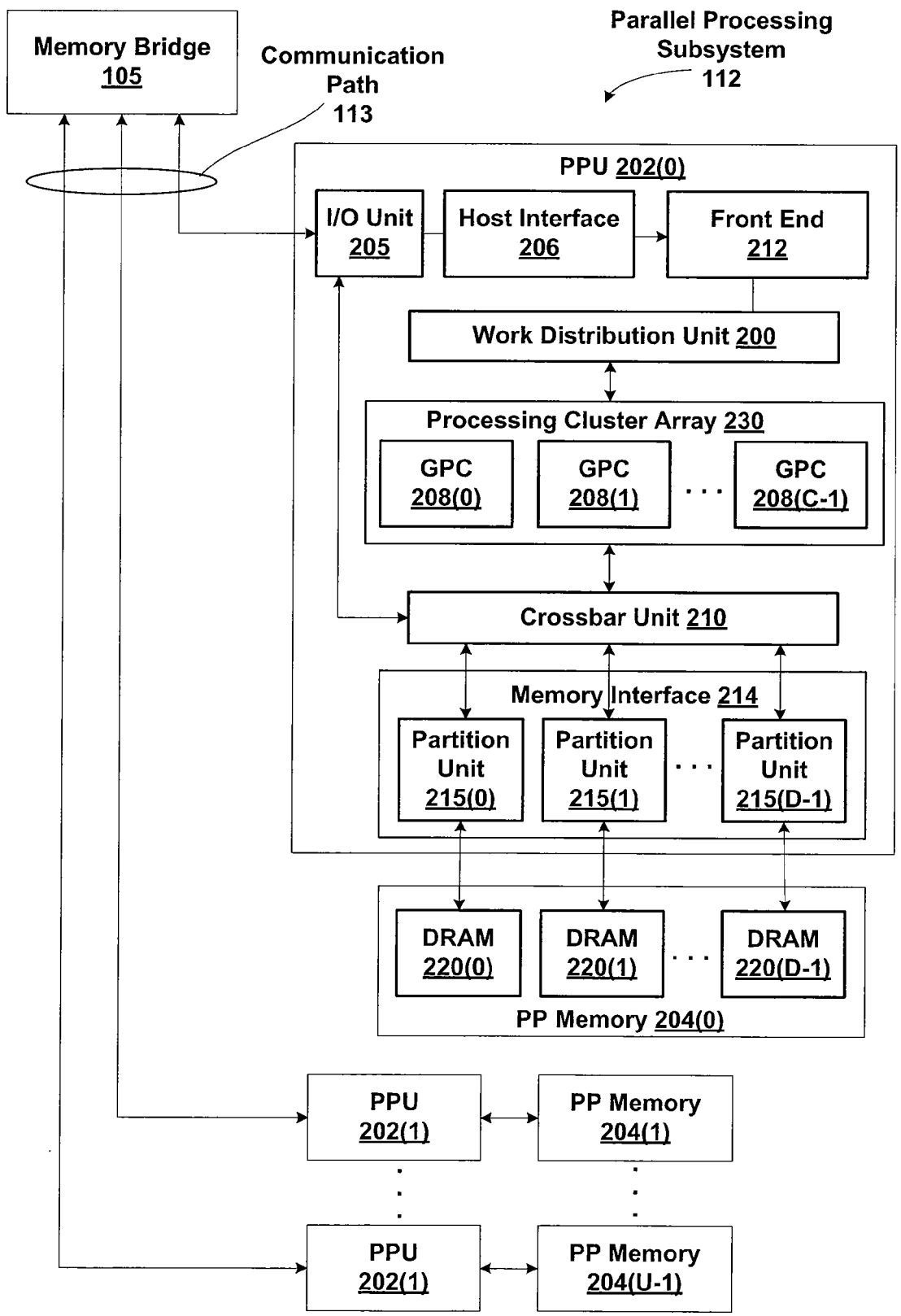
FIG. 2 is a block diagram of a parallel processing subsystem for the computer system of FIG. 1, according to one embodiment of the invention.

FIG. 2 illustrates a parallel processing subsystem 112, according to one embodiment of the invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
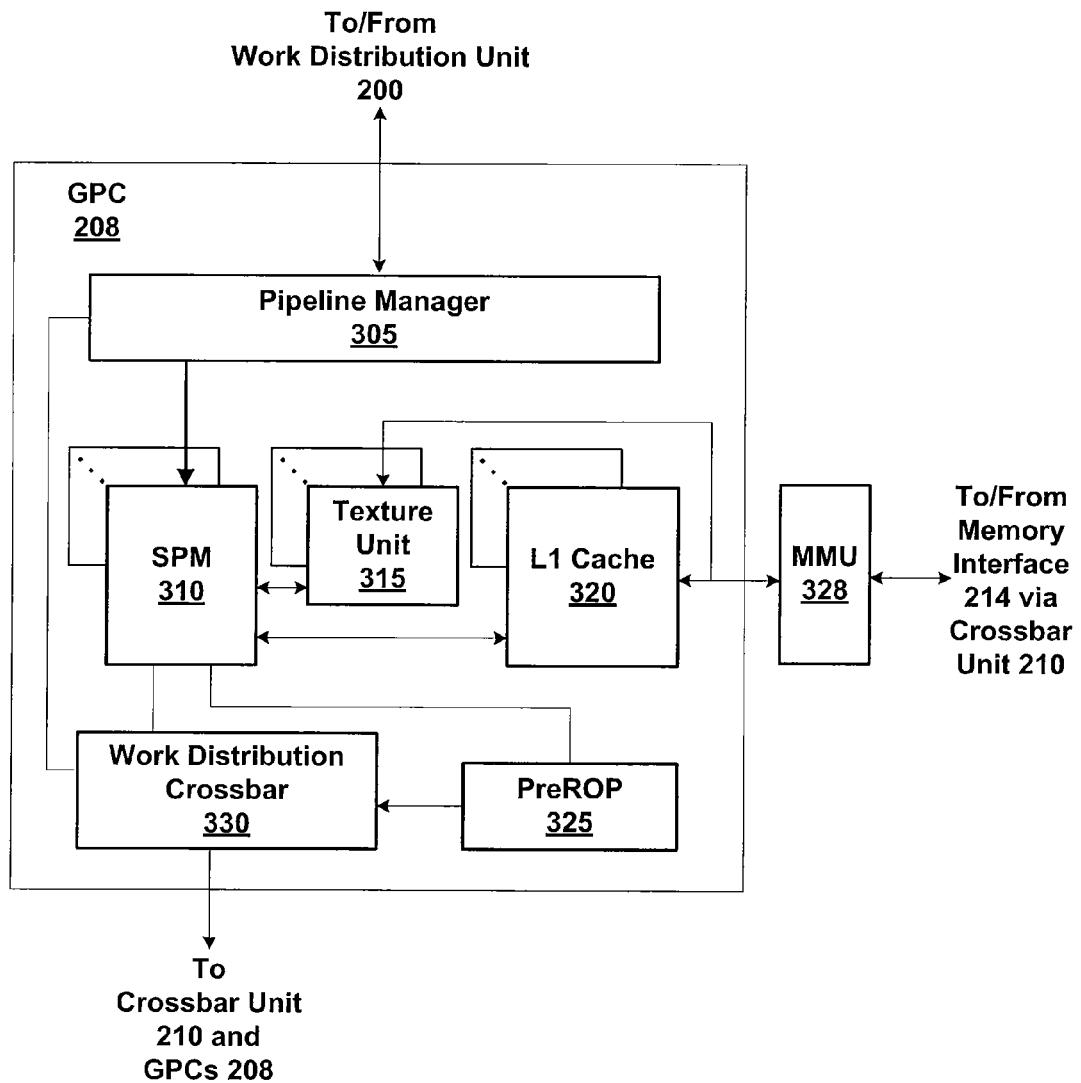
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
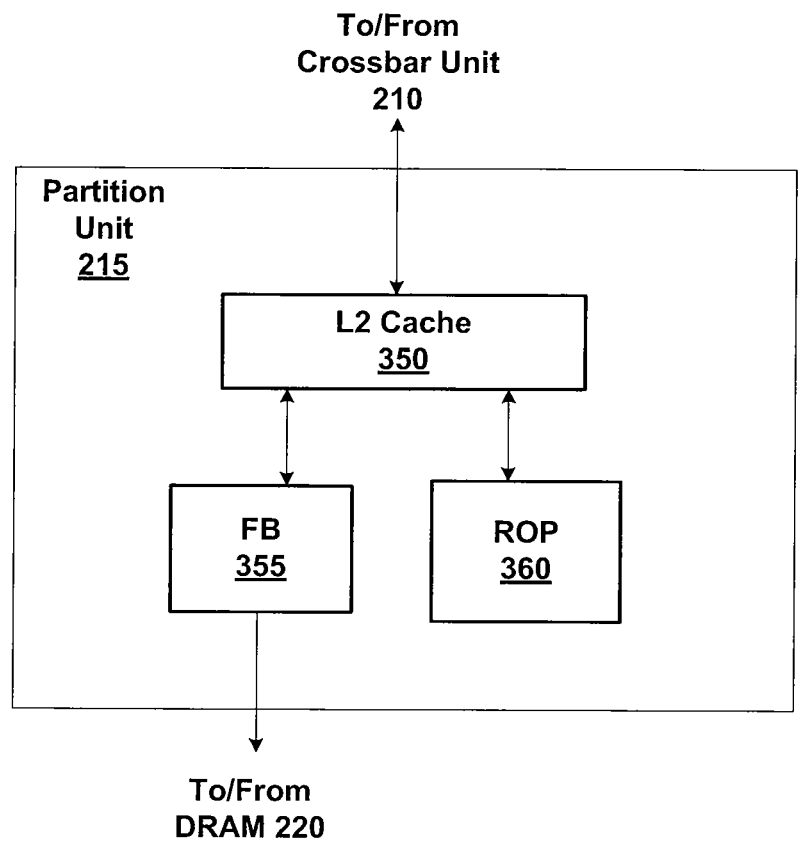
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
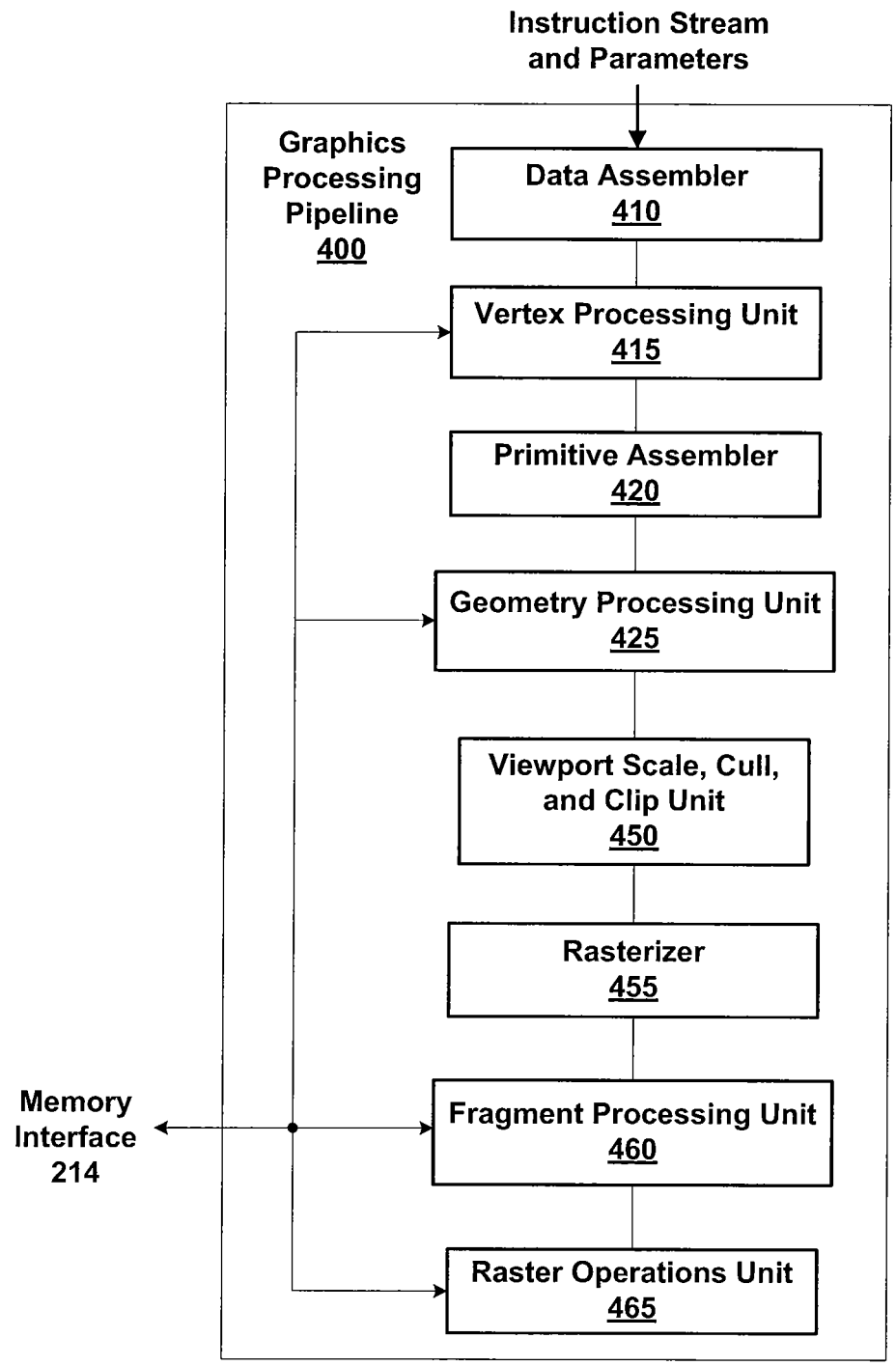
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Testbench System Overview

Figure 5:
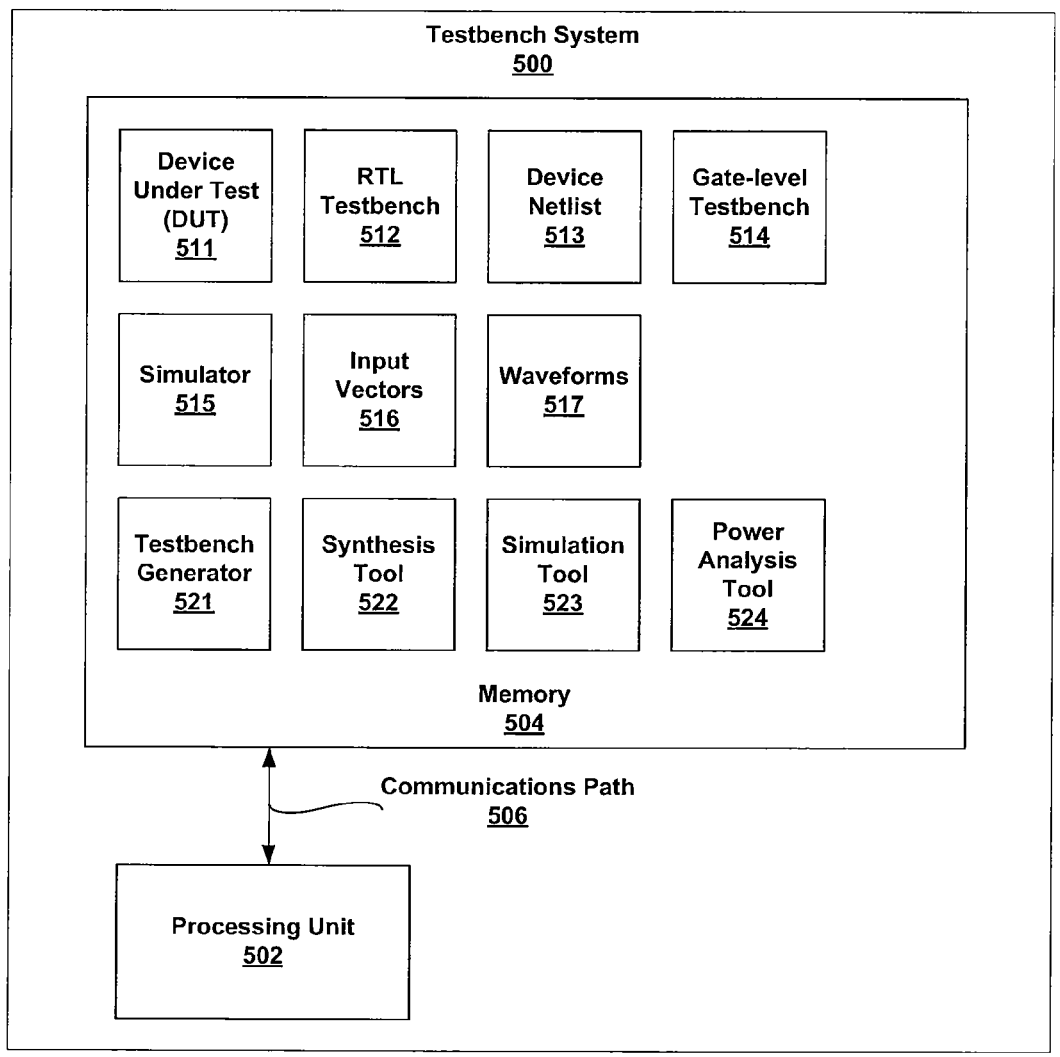
FIG. 5 is a block diagram illustrating a testbench system within which one or more aspects of the invention may be implemented.

FIG. 5 illustrates a testbench system 500 configured to implement one or more aspects of the present invention. As shown, testbench system 500 includes, without limitation, a processing unit 502 and memory 504 communicating through communications path 506. Processing unit 502 controls the operation of testbench system 500 and contains logic to execute software programs stored in memory 504. Processing unit 502 may be a processing unit, such as a central processing unit (CPU) or other special purpose processing unit or programmable logic device.

Memory 504 is an internal memory unit that stores software instructions to be executed and data to be processed by processing unit 502. As shown, memory 504 includes software tools, such as testbench generator 521, synthesis tool 522, simulation tool 523, and power analysis tool 524. In addition, memory 504 also stores source code such as device under test (DUT) 511, RTL testbench 512, device netlist 513, and gate-level testbench 514, as well as compiled executable simulator 515, input vectors 516, and waveforms 517.

Testbench generator 521 is a software tool used to implement DUT 511 as a testbench device on which testing is performed. In one embodiment, testbench generator 521 creates hardware description language (HDL) code for an integrated circuit design written in Verilog. In alternative embodiments, testbench generator 521 may create HDL code for an integrated circuit design written in VHDL. Testbench generator 521 implements RTL testbench 512 by wrapping standard code around the HDL code in DUT 511. The standard code provides additional functionality to DUT 511 including adding timescale information and ports for applying input vectors or reading output vectors. It will be appreciated that testbench generator 521 may be any conventional automated testbench generation software known in the art, such as software tool tbgen.

Synthesis tool 522 is a software tool used to implement DUT 511 as a gate-level design. Conventionally, synthesis tools receive a standard cell library and an RTL source code implementation of an integrated circuit device as input and generate a gate-level netlist as output. In one embodiment, synthesis tool 522 may implement DUT 511 as device netlist 513 in Verilog. It will be appreciated that synthesis tool 522 may be any conventional synthesis tool known in the art, such as Synopsys Design Compiler.

Simulation tool 523 is a software tool used to generate a binary executable that runs a simulation on processing unit 502. Simulation tool 523 receives HDL files such as RTL testbench 512 or gate-level testbench 514 as input and produces executable simulator 515 as output. In one embodiment, simulation tool receives Verilog files as input and generates ANSI C code that is then compiled using standard C compiler gcc. It will be appreciated that simulation tool 523 may be any conventional simulation tool known in the art, such as Synopsys VCS.

Power analysis tool 524 is a software tool that analyzes the waveform data and generates estimates of the energy consumed by device netlist 513 during the simulation. In one embodiment, waveforms 517 is converted from a fast signal database (FSDB) format to a switching activity input file (SAIF) format. The SAIF file contains information about each of the nodes in waveforms 517 such as the toggle count of the node, switching probability of the node, and static probability that the node is at either logic level '0' or '1' for the duration of the simulation. Power analysis tool 524 uses the information contained in the SAIF file and a standard cell library as well as standard capacitance values for each of the nodes to estimate total power consumption at each node. The power consumption at each node is summed to generate the total power consumption of device netlist 513 for the duration of the simulation. It will be appreciated that power analysis tool 523 may be any conventional simulation tool known in the art that analyzes the waveform data generated by a simulation, such as Synopsys PrimeTime PX.

DUT 511 is an HDL implementation of an integrated circuit device. An RTL abstraction is a high-level abstraction of the integrated circuit device that implements the logical functionality of the device in software without relying on any standardized hardware logic gates. DUT 511 is source code written at an RTL level of abstraction in any one of the various HDL languages known in the art. In one embodiment, DUT 511 may be Verilog code for PPU 202. In alternative embodiments, DUT 511 may be Verilog code for a sub-unit of PPU 202, such as GPC 208. It will be appreciated that DUT 511 may be any integrated circuit design implemented in HDL code at an RTL level of abstraction, including, without limitation, a small integrated circuit modeled with only a few hundred logic gates or a far more complex integrated circuit such as an entire processing unit.

RTL testbench 512 is also an HDL implementation of an integrated circuit device. Testbench generator 521 implements RTL testbench 512 by wrapping standard code around the HDL code in DUT 511. As discussed above, the standard code provides additional functionality to DUT 511 including adding timescale information and ports for applying input vectors or reading output vectors during simulation. For example, testbench generator 521 adds ports for applying a set of input vectors to as well as recording the resulting output vectors from DUT 511.

Device netlist 513 is a gate-level implementation of DUT 511. DUT 511 implements the integrated circuit under test at the RTL level of abstraction, while device netlist 513 implements the integrated circuit under test at the gate-level level of abstraction. Synthesis tool 522 generates device netlist 513 using a standard library of logic cells and DUT 511.

Gate-level testbench 514 is an HDL implementation of device netlist 513. Testbench generator 521 implements gate-level testbench 514 by wrapping standard code around the HDL code in device netlist 513. As discussed above, the standard code provides additional functionality to device netlist 513 including adding timescale information and ports for applying input vectors or reading output vectors during simulation. For example, testbench generator 521 adds ports for applying a set of input vectors to as well as recording the resulting output vectors from device netlist 513.

Simulator 515 is a binary executable that may be executed on processing unit 502. Simulator 515 applies input vectors 516 to the device implemented in the HDL code used to generate simulator 515 in simulation tool 523 and writes the resulting waveforms generated at each node in the device to waveform 517. Command line arguments may be passed to simulator 515 at run-time in order to insert various delays at input interfaces or force stalls at output interfaces in the device.

Input Vectors 516 are vectors corresponding to known high-activity workloads for the designed device implemented in DUT 511 and device netlist 513. Waveforms 517 is the output file containing the state information for each of the nodes in the implemented device throughout the duration of the simulation. In one embodiment, waveforms 517 is an FSDB file.

The manner in which the various components of testbench system 500 operate to realize embodiments of the invention is described in greater detail below in conjunction with FIGS. 6A, 6B, and 7.

Figure 6A:
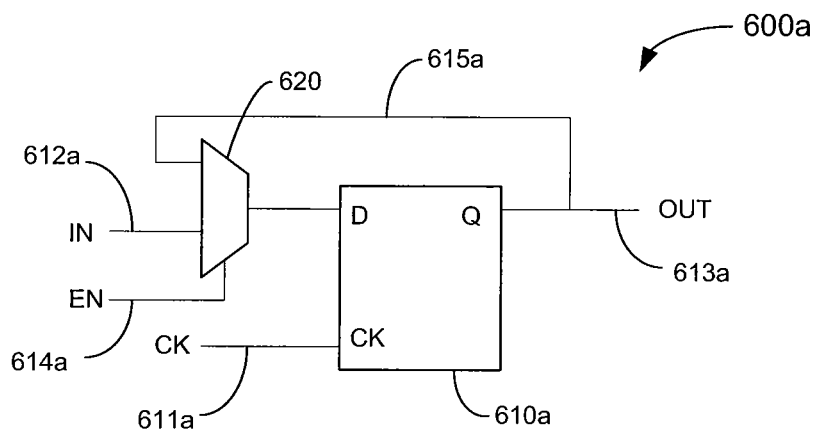
FIG. 6A is a schematic diagram of an exemplary non-clock-gated circuit, according to one embodiment of the invention.

FIG. 6A is a schematic diagram of an exemplary non-clock-gated circuit 600a, according to one embodiment of the invention. As shown, non-clock-gated circuit 600a includes flip-flop 610a, mux 620, and interconnects 611a through 615a. The interconnects include clock signal 611a, input data signal 612a, output data signal 613a, enable signal 614a, and feedback signal 615a.

In operation, non-clock-gated circuit 600a latches the signal connected to the D-input of flip-flop 610a on the rising edge of clock signal 611a. Output data signal 613a and feedback signal 615a are connected to the Q-output of flip-flop 610a. Mux 620 connects the D input of flip-flop 610a to input data signal 612a when enable signal 614a is at logic level '1' and connects the D input of flip-flop 610a to feedback signal 615a when enable signal 614a is at logic level '0.'

In this manner, the state of flip-flop 610a transitions on the positive rising edge of clock signal 611a only when enable signal 614a is at logic level '1' and input data signal 612a is not equal to feedback signal 615a. However, even though the state of flip-flop 610a may not change during every cycle of clock signal 611a, the transistors that comprise flip-flop 610a transition at every clock cycle, thereby consuming power.

Figure 6B:
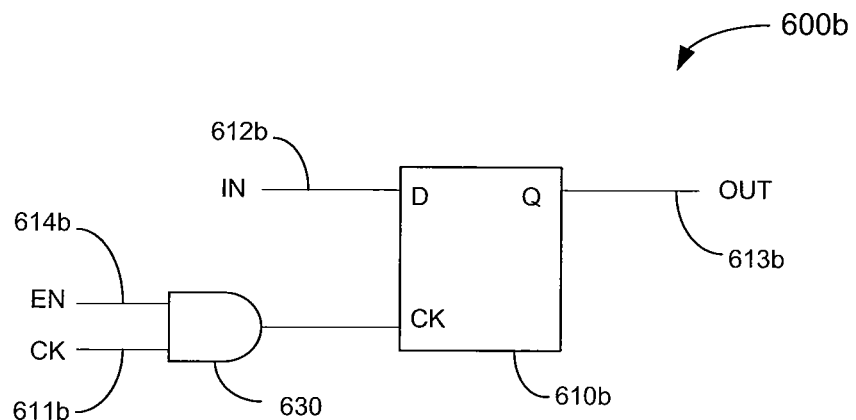
FIG. 6B is a schematic diagram of an exemplary clock-gated circuit, according to one embodiment of the invention.

FIG. 6B is a schematic diagram of an exemplary clock-gated circuit 600b, according to one embodiment of the invention. As shown, clock-gated circuit 600b includes flip-flop 610b, clock-gating logic 630, and interconnects 611b through 614b. The interconnects include clock signal 611b, input data signal 612b, output data signal 613b, and enable signal 614b.

In operation, clock-gated circuit 600b latches the signal connected to the D-input of flip-flop 610b on the rising edge of the signal connected to the CK input of flip-flop 610b. Output signal 613b is connected to the Q-output of flip-flop 610b. Clock-gating logic 630 connects the CK input of flip-flop 610b to the output of an AND logic gate connected to clock signal 611b and enable signal 614b. Input signal 612b is connected to the D-input of flip-flop 610b.

Similarly to non-clock-gated circuit 600a, the state of flip-flop 610b transitions on the positive rising edge of clock signal 611b only when enable signal 614b is at logic level '1.' However, in contrast to non-clock-gated circuit 600a, the transistors that comprise flip-flop 610b only transition at every clock cycle when enable signal 614b is at logic level '1.' Therefore, the power consumption of clock-gated circuit 600b may be less than the power-consumption of non-clock-gated circuit 600a.

Conventional approaches guage TDP power efficiency by determining whether combinational logic, such as clock-gating logic 630, is present in an integrated circuit under test. Consequently, conventional approaches merely convey a percentage of flip-flops in the circuit that include clock-gating logic as a proxy for actual TDP power efficiency. Importantly, however, as the circuits of FIGS. 6A and 6B demonstrate, such conventional approaches oftentimes may produce imprecise results that do not necessarily convey accurately the actual power efficiency of a given circuit.

More specifically, the actual dynamic power consumption of clock-gated circuit 600b is reduced only if the combinational logic prevents the CK input of flip-flop 610b from transitioning from low to high during periods of inactivity. For example, under a conventional approach, clock-gated circuit 600b would have a TDP power efficiency value of 100% because all flip-flops in the circuit include clock-gating logic. However, the conventional approach fails to determine whether enable signal 614b is transitioning from high to low during periods of inactivity, thereby preventing the CK input of flip-flop 610b from transitioning from low to high. It is possible that an integrated circuit device that includes clock-gated circuit 600b may actually use more power than non-clock-gated circuit 600a if the clock-gating logic is inefficient, e.g. when the clock-gating logic adds additional power to the integrated circuit device while not also reducing power consumption of clock-gated circuit 600b during periods of inactivity. Therefore, the conventional approach may be a very misleading metric in gauging actual TDP power efficiency.

The technique described herein and set forth below in FIG. 7 compute TDP power efficiency in a manner that also accounts for the efficiency of clock enable signals to turn off parts of the circuit during periods of inactivity. As a result, the techniques described herein provide more precise information relative to conventional approaches for determining TDP power efficiency that more accurately reflect the power efficiency of a given circuit.

Figure 7A:
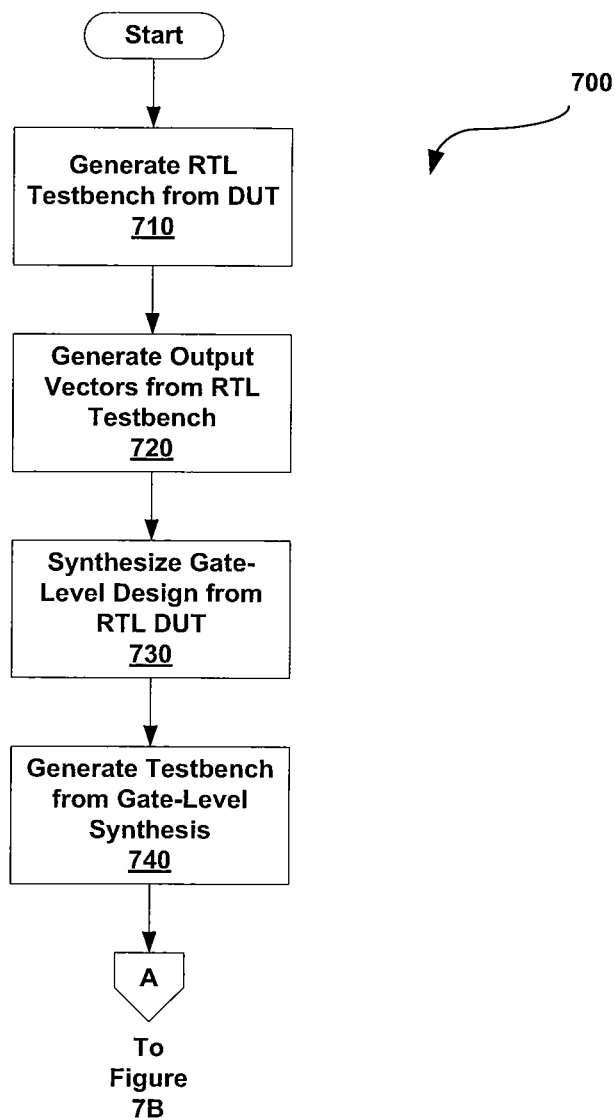
FIGS. 7A-7B set forth a flowchart of a method for determining TDP power efficiency for a circuit, according to one embodiment of the invention.
Figure 7B:
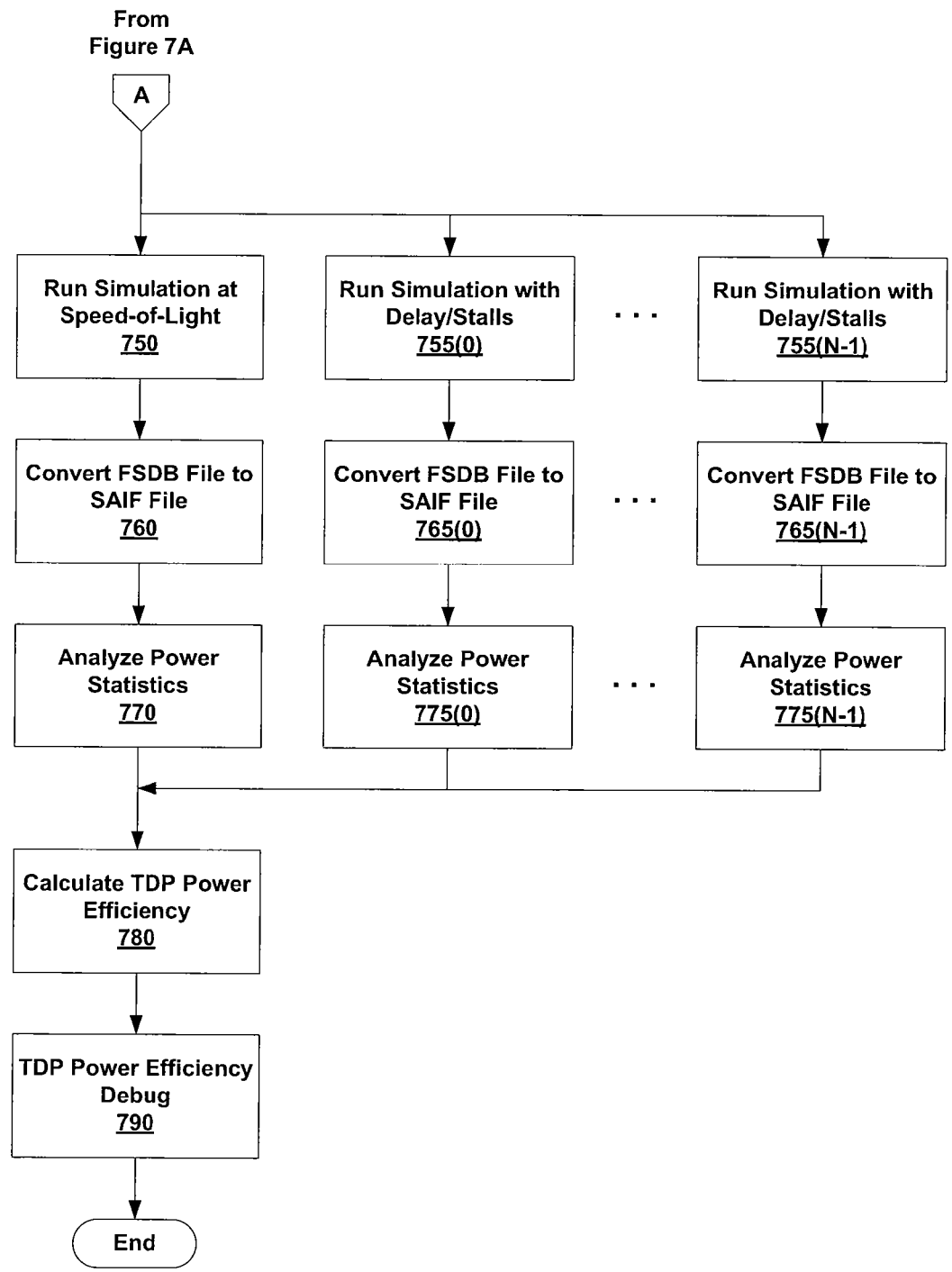

FIGS. 7A-7B set forth a flowchart of a method 700 for determining TDP power efficiency for a circuit, according to one embodiment of the invention. Although the method steps are described in conjunction with the systems of FIGS. 5, 6A, and 6B, persons skilled in the art will understand that any system configured to perform the method steps, in any order, is within the scope of the inventions.

The method 700 begins at step 710, where processing unit 502 generates RTL testbench 512. Testbench generator 521 is executed on processing unit 502, receiving the HDL source code in DUT 511 as input and generating RTL testbench 512 as output. In one embodiment, DUT 511 is the HDL implementation of PPU 202. It will be appreciated that DUT 511 may be any HDL implementation of an integrated circuit device to be tested.

At step 720, processing unit 502 generates output vectors during a simulation of RTL testbench 512. Simulation tool 523 is executed on processing unit 502, receiving the HDL source code contained in RTL testbench 512 as input and generating simulator 515 as output. Simulator 515 is a binary executable configured to be executed on processing unit 502.

As discussed above, simulation tool 523 first converts RTL testbench 512 into ANSI C code and then compiles the ANSI C code. Simulator 515 is then executed on processing unit 502, receiving input vectors 516 as input and generating output vectors that may be checked against the expected output vectors of the integrated circuit device implemented in DUT 511. As persons skilled in the art will appreciate, if the generated output vectors do not match the expected output vectors, then the HDL code in DUT 511 may contain errors that need to be debugged before continuing with the method 700.

At step 730, synthesis tool 522 synthesizes DUT 511 as a device at a gate-level of abstraction and generates device netlist 513. Device netlist 513 is HDL source code that implements interconnections between standard logic cells in order to create the same behavioral logic contained in DUT 511. At step 740, processing unit 502 generates gate-level testbench 514. Testbench generator 521 is executed on processing unit 502, receiving the HDL source code in device netlist 513 as input and generating gate-level testbench 514.

At step 750, processing unit 502 generates waveforms 517 during a simulation of gate-level testbench 514 in order to analyze the power consumption of synthesized device netlist 513. Simulation tool 523 is executed on processing unit 502, receiving the HDL source code contained in gate-level testbench 514 as input and replacing the binary executable in simulator 515. Again, simulator 515 is a binary executable configured to be executed on processing unit 502.

As part of step 750, simulator 515 also is executed on processing unit 502 in order to generate waveforms 517 corresponding to a speed-of-light (SOL) execution of a high-activity workload applied to the integrated circuit device implemented in device netlist 513. As is well-known, SOL execution is defined as the fastest possible execution time to which the input vectors associated with the high-activity workload may be applied to and the output waveforms read from the integrated circuit device implemented in device netlist 513. As previously set forth herein, in some embodiments, testbench generator 521 may include functionality that allows a command line argument to be passed to compiled simulator 515 in order to control the insertion of a variable number of delays between input vectors applied at a particular input interface or a variable number of stalls between successive outputs read from a particular output interface in device netlist 513. Therefore, in step 750, simulator 515 may be executed with command line arguments that cause zero delays or stalls to be inserted in the operation of device netlist 513.

At step 760, processor 502 converts waveforms 517 into an SAIF format. It will be appreciated that step 760 may be skipped if power analysis tool 524 can, itself, analyze waveforms 517 in the FSDB or other formats. At step 770, power analysis tool 524 reads the converted waveforms 517 file and generates an average dynamic power consumption value based on an estimated capacitance in each node and the statistics contained in converted waveforms 517. The average dynamic power consumption value calculated in step 770 is used as a baseline value for calculating an improved TDP power efficiency metric in step 780.

Step 755(i) is similar to step 750, except that different command line arguments are passed to simulator 515 in order to run a test that varies the run-time of the high-activity workload applied to the integrated circuit device in step 750. At step 755(i), simulator 515 is executed with intentional delays or stalls inserted at the input and output interfaces, respectively. Simulator 515 generates a new waveforms 517 corresponding to the delayed or stalled simulation. It will be appreciated that varying the run-time of the simulation may be accomplished in any manner known in the art.

At step 765(i), processor 502 converts waveforms 517 generated in step 755(i) into an SAIF format. It will be appreciated that step 765(i) may be skipped if power analysis tool 524 can, itself, analyze waveforms 517 in the FSDB or other formats. At step 775(i), power analysis tool 524 reads the converted waveforms 517 file and generates an average dynamic power consumption value based on an estimated capacitance in each node and the statistics contained in converted waveforms 517.

As described above, method 700 runs a simulation of the same workload spread over various total number of clock cycles in order to measure the effectiveness of the integrated circuit's power saving techniques during periods of inactivity. Steps 750, 760 and 770 measure the dynamic power consumption of the device during a simulation with zero periods of inactivity. Steps 755(i), 765(i), and 775(i) measure the dynamic power consumption of the device during a simulation with various periods of inactivity. One or more simulations are run with different numbers of inserted delays and stalls in order to measure TDP power efficiency with various conditions applied to the device.

At step 780, processing unit 502 calculates a TDP power efficiency metric. In one embodiment, TDP power efficiency, denoted as $\alpha^o$, is measured as the ratio of the dynamic energy consumed by the tested device under the SOL condition to the dynamic energy consumed by the tested device under the delayed condition, as illustrated below in Equation (i).

$$\alpha^0 = \frac{E_{SOL}}{E_{Delayed}} \quad (i)$$

The dynamic energy is equal to the average dynamic power times the run-time of the simulation. The average dynamic power consumption for the delayed condition is less than the average dynamic power consumption under the SOL condition if the clock-gating logic is efficient at turning off the transitioning of flip-flops during periods of inactivity. Correspondingly, in a maximally-efficient design, the total energy consumption during the simulation of the delayed condition is equal to the total energy consumption during the simulation of the SOL condition. To better focus on sources of inefficiency under the control of the designer, overhead energy, such as static leakage power, as well as dynamic power from the clock gates (ICGs), estimated clock tree and non-gated flops are excluded from the computation reflected in Equation (i).

With this definition of TDP power efficiency, for an insufficient variance in the run-time between the delayed condition and the SOL condition ($T_{Delayed} = T_{SOL}$), TDP power efficiency is approximately 1, regardless of the underlying TDP power efficiency of the tested device. For example, some testing situations may call for a small number of delays or stalls to be inserted in the simulation. For workloads that are hundreds or thousands of vectors long, the insertion of 10 or 20 clock delays may be insufficient to see a significant change in energy consumption.

One approach to addressing this condition is to choose a sufficiently high threshold ($\beta$) to ensure the run-time of the simulation for the delayed condition is much larger than the run-time of the simulation for the SOL condition ($T_{Delayed} >= \beta T_{SOL}$). A threshold that increases the run-time of the delayed condition two-fold or more over the SOL condition ($\beta >= 2$) is typically preferred.

Consequently, in alternative embodiments, a second TDP power efficiency, denoted as $\alpha'$, may be measured as a ratio involving the average dynamic power consumption and the run-time between the delayed condition and the SOL condition, as illustrated in Equation (ii).

$$\alpha' = \frac{1 - P_{Delayed}/P_{SOL}}{1 - T_{SOL}/T_{Delayed}} \quad (ii)$$

The second TDP power efficiency metric may provide better approximations of actual TDP power efficiency for run-times that do not have a high variance in relation to the SOL condition run-time. In the second TDP power efficiency metric, $\alpha'$ may be less than 0, which indicates that there may have been an error in the simulation, such as the delayed condition run-time being less than the SOL condition run-time, or that some inefficiency exists in the tested device that causes average dynamic power consumption to increase during periods of inactivity.

At step 790, the device netlist 513 is debugged to correct any inefficiencies discovered in step 780 during calculation of the various TDP power efficiency metrics. The TDP power efficiency metric may be used to pinpoint inefficient use of clock enable signals during periods of inactivity. Therefore, the designer may re-design the clock-gating logic in order to increase the power saving functionality of the integrated circuit device under test.

For example, a designer may determine the efficiency of clock-gating logic for each ICG in the integrated circuit design. In one embodiment, the ICG enable time for the delayed condition run-time is compared to the ICG enable time for the SOL condition run-time to pinpoint particularly inefficient clock-gating logic. For example, a percentage of ICG enables per additional cycles may be calculated by dividing the difference of the number of clock cycles the ICG is enabled during the delayed condition runtime and the number of clock cycles the ICG is enabled during the SOL condition runtime by the difference of the delayed condition runtime and the SOL condition runtime, as illustrated in Equation (iii).

$$\% \; ICG \; \text{Enable per additional cycles} = \frac{ICG\_enable_{Delayed} - ICG\_enable_{SOL}}{T_{Delayed} - T_{SOL}} \quad (iii)$$

Designers may use the information calculated based on Equation (iii) to pinpoint a particular ICG where a redesign of the clock-gating logic may increase power saving efficiency in the integrated circuit device.

In sum, the technique used for verification flow and methodology for finding a TDP power efficiency metric disclosed above provides a more accurate measure of the power efficiency of an integrated circuit. More specifically, TDP power efficiency is calculated by comparing energy statistics for a simulation of operations corresponding to known high activity workloads for the integrated circuit under varying conditions. In the first instance, the simulation is run at full speed-of-light (no artificial delays/stalls inserted between successive commands) to generate energy statistics to serve as a control set. Then one or more instances of the simulation are run with varying numbers of artificial delays/stalls inserted between successive commands to generate energy statistics for the integrated circuit for differing test conditions. The energy statistics for the control set are compared to the sets of energy statistics associated with each test condition to determine overall TDP power efficiency for the integrated circuit.

One advantage of the disclosed approach is that the actual efficiency of an integrated circuit device when entering low power states during periods of inactivity is examined. By contrast, conventional approaches to determining TDP power efficiency merely look at whether clock-gating logic exists, but fail to examine the actual functionality of the clock-gating logic to determine activity during periods of inactivity. The disclosed metric provides integrated circuit designers with more precise information that accurately reflects the efficiency of power saving techniques implemented in integrated circuit devices. Thus, the TDP power efficiency metric provides feedback to the designer about the actual functionality of the device, and may be used to find areas of the design that need improvement. For example, the TDP power efficiency metric could indicate that clock enable signals for a specific logical unit are not properly turning off even during long periods of inactivity.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for determining thermal design point (TDP) power efficiency for an integrated circuit, the method comprising:
   simulating the execution of a set of input vectors on a model of the integrated circuit to generate a first estimated power consumption data for the integrated circuit during a first number of clock cycles, wherein the set of input vectors represent a high-activity workload for the integrated circuit;
   simulating the execution of the set of input vectors on the model of the integrated circuit to generate a second estimated power consumption data for the integrated circuit during a second number of clock cycles, wherein the second number of clock cycles is larger than the first number of clock cycles; and
   calculating TDP power efficiency for the integrated circuit based on the first estimated power consumption data and the second estimated power consumption data.

2. The method of claim 1, wherein the step of calculating TDP power efficiency for the integrated circuit comprises:
   determining a first dynamic energy consumption for the integrated circuit based on the first estimated power consumption data;
   determining a second dynamic energy consumption for the integrated circuit based on the second estimated power consumption data; and
   dividing the second dynamic energy consumption by the first dynamic energy consumption.

3. The method of claim 1, wherein the step of calculating TDP power efficiency for the integrated circuit comprises:
   determining a first average dynamic power consumption for the integrated circuit based on the first estimated power consumption data;
   determining a second average dynamic power consumption for the integrated circuit based on the second estimated power consumption data;
   dividing the second average dynamic power consumption by the first average dynamic power consumption to produce a first ratio;
   dividing the first number of clock cycles by the second number of clock cycles to produce a second ratio; and
   dividing the difference between one and the first ratio by the difference between one and the second ratio.

4. The method of claim 1, wherein the first estimated power consumption data and the second estimated power consumption data are generated based on data in a fast signal database (FSDB) format.

5. The method of claim 1, wherein the step of simulating the execution of the set of input vectors on the model of the integrated circuit to generate the first estimated power consumption data comprises:
   generating first hardware description language (HDL) source code that implements the integrated circuit at a gate-level abstraction;
   generating second HDL source code that implements a testbench which instantiates the first HDL source code, wherein the second HDL source code includes functionality to implement delays between each vector in the set of input vectors executed on the model of the integrated circuit;
   compiling the second HDL source code to generate a simulation program; and
   executing the simulation program to generate the first estimated power consumption data, wherein the simulation program is configured during execution to not implement the delays between each vector in the set of input vectors executed on the model of the integrated circuit.

6. The method of claim 5, wherein the step of simulating the execution of the set of input vectors on the model of the integrated circuit to generate the second estimated power consumption data comprises:
executing the simulation program to generate the second estimated power consumption data,
wherein the simulation program is configured during execution to implement the delays between each vector in the set of input vectors executed on the model of the integrated circuit.

7. The method of claim 6, wherein implementing the delays between each vector of the set of input vectors executed on the model of the integrated circuit causes the second number of clock cycles to be at least twice as large as the first number of clock cycles.

8. The method of claim 6, wherein the first HDL source code is generated from third HDL source code that implements the integrated circuit at a register-transfer-level abstraction.

9. A system for determining thermal design point (TDP) power efficiency for an integrated circuit, the system comprising:
a memory, wherein the memory includes:
a model of the integrated circuit, and
a set of input vectors; and
a processing unit, wherein the processing unit is configured to:
simulate the execution of a set of input vectors on the model of the integrated circuit to generate a first estimated power consumption data for the integrated circuit during a first number of clock cycles, wherein the set of input vectors represent a high-activity workload for the integrated circuit,
simulate the execution of the set of input vectors on the model of the integrated circuit to generate a second estimated power consumption data for the integrated circuit during a second number of clock cycles, wherein the second number of clock cycles is larger than the first number of clock cycles, and
calculate TDP power efficiency for the integrated circuit based on the first estimated power consumption data and the second estimated power consumption data.

10. The system of claim 9, wherein the processing unit calculates TDP power efficiency for the integrated circuit by:
determining a first dynamic energy consumption for the integrated circuit based on the first estimated power consumption data;
determining a second dynamic energy consumption for the integrated circuit based on the second estimated power consumption data; and
dividing the second dynamic energy consumption by the first dynamic energy consumption.

11. The system of claim 9, wherein the processing unit calculates TDP power efficiency for the integrated circuit by:
determining a first average dynamic power consumption for the integrated circuit based on the first estimated power consumption data;
determining a second average dynamic power consumption for the integrated circuit based on the second estimated power consumption data;
dividing the second average dynamic power consumption by the first average dynamic power consumption to produce a first ratio;
dividing the first number of clock cycles by the second number of clock cycles to produce a second ratio; and
dividing the difference between one and the first ratio by the difference between one and the second ratio.

12. The system of claim 9, wherein the model of the integrated circuit is hardware description language (HDL) source code that implements the integrated circuit at a register-transfer-level abstraction.

13. The system of claim 12, wherein the memory further includes a synthesis software that, when executed on the processing unit, is configured to receive the model of the integrated circuit and generate first hardware description language (HDL) source code that implements the integrated circuit at a gate-level abstraction.

14. The system of claim 13, wherein the memory further includes a testbench-generator software that, when executed on the processing unit, is configured to generate second HDL source code that implements a testbench which instantiates the first HDL source code, wherein the second HDL source code includes functionality to implement delays between each vector in the set of input vectors executed on the model of the integrated circuit.

15. The system of claim 14, wherein the memory further includes a simulation software that, when executed on the processing unit, is configured to compile the second HDL source code in order to generate a simulation program that is configured to be executed on the processing unit.

16. The system of claim 15, wherein the memory further includes a power-analysis software that, when executed on the processing unit, is configured to:
generate a first dynamic energy consumption for the integrated circuit based on the first estimated power consumption data; and
generate a second dynamic energy consumption for the integrated circuit based on the second estimated power consumption data.

17. The system of claim 15, wherein the simulation program, when executed on the processing unit, is configured to generate estimated power consumption data based on data in a fast signal database (FSDB) format.

18. The system of claim 16, wherein the processing unit simulates the execution of the set of input vectors on the model of the integrated circuit to generate a first estimated power consumption data by:
generating first hardware description language (HDL) source code that implements the integrated circuit at a gate-level abstraction;
generating second HDL source code that implements a testbench of the first HDL source code, wherein the second HDL source code includes functionality to implement delays between each vector in the set of input vectors executed on the model of the integrated circuit;
compiling the second HDL source code to generate a simulation program; and
executing the simulation program to generate the first estimated power consumption data,
wherein the simulation program is configured during execution to not implement the delays between each vector in the set of input vectors executed on the model of the integrated circuit.

19. The system of claim 18, wherein the processing unit simulates the execution of the set of input vectors on the model of the integrated circuit to generate a second estimated power consumption data by:
executing the simulation program to generate the second estimated power consumption data, wherein the simulation program is configured during execution to implement the delays between each vector in the set of input vectors executed on the model of the integrated circuit.

20. The system of claim 19, wherein implementing the delays between each vector of the set of input vectors executed on the model of the integrated circuit causes the second number of clock cycles to be at least twice as large as the first number of clock cycles.

* * * * *